T. H. BRIGG.
METHOD OF AND APPARATUS FOR HAULING LIMBERED VEHICLES.
APPLICATION FILED FEB. 3, 1919.
1,331,123.  Patented Feb. 17, 1920.
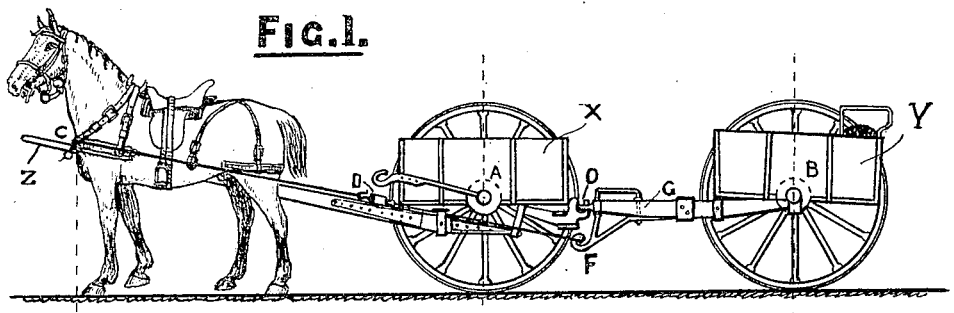
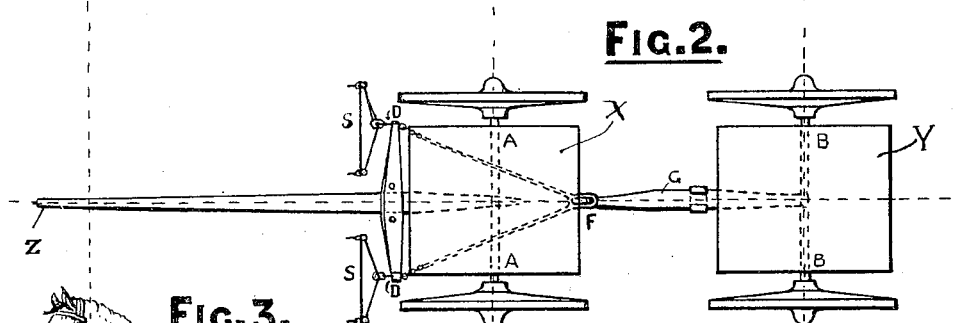
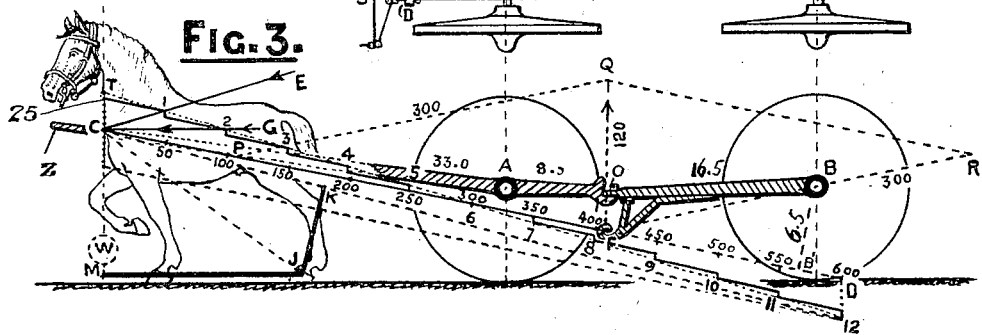
Witnesses:  Inventor:
Thomas Hargreaves Brigg

UNITED STATES PATENT OFFICE.

THOMAS HARGREAVES BRIGG, OF LONDON, ENGLAND.

METHOD OF AND APPARATUS FOR HAULING LIMBERED VEHICLES.

1,331,123. Specification of Letters Patent. Patented Feb. 17, 1920.

Application filed February 3, 1919. Serial No. 274,773.

*To all whom it may concern:*

Be it known that I, THOMAS HARGREAVES BRIGG, of Colehill Gardens, Bishop's Park, London, S. W. 6, in the county of Middlesex, England, have invented certain new and useful Improvements in Methods of and Apparatus for Hauling Limbered Vehicles, of which the following is a specification.

My invention relates to a method of and apparatus for hauling limbered vehicles such as gun-carriages, limbered general service wagons and the like by horses or any other draft animals. This invention, however, is equally applicable to limbered vehicles drawn by mechanical tractors, both for civil and military purposes.

An object of my invention is the provision of a method and apparatus for securing a maximum efficiency in enabling horses to transport themselves and their loads with the greatest ease and comfort on all the varying conditions of a roadway.

I will describe one method and one apparatus for hauling limbered vehicles and will then point out the novel features thereof in claims.

In the accompanying drawings:

Figure 1 is a view showing in side elevation a limbered wagon having applied thereto one form of hauling apparatus embodying my invention;

Fig. 2 is a plan view of Fig. 1;

Fig. 3 is a view similar to Fig. 1 with a graphic diagram showing the mechanical levers and a resolution of some of the forces which are operative in performing my method of hauling.

Fig. 4 is a supplementary illustration of the bell-crank lever to illustrate the character of the forces exerted and character of the force exerted by a horse and its action upon the two sections of the limbered vehicle.

Fig. 5 is a view showing in side elevation the front portion of a front section of a limbered vehicle shown in the preceding figures, and, Fig. 6 is a similar view showing the rear section of a vehicle detached from the front section.

Similar reference characters refer to similar parts in each of the several views.

Referring specifically to the drawings, I have here shown a conventional form of limbered vehicle comprising a front section X and a rear section Y pivotally connected to the front section at the point O. The front section X is provided with a tongue which is connected to the axle A, and a rear section Y provided with a pole or "perch" G, which is connected to the axle B.

The hauling apparatus embodying the subject-matter of my invention comprises a hook F, which is fixed to and depends from the pole G at a point adjacent the pivot O. Slidable longitudinally on the tongue Z is a double tree D which is provided with the usual swingle trees S. The opposite end of the double tree D is connected at a common point to the hook F by means of traces or other flexible connections, so that any pull exerted upon the swingle trees S bears directly upon the hook F and not upon the tongue Z. The manner in which the double tree D is connected to the hook F is such that the traces coact with the double tree to form a triangle and may be indicated by the letters D—F—D.

When the hauling apparatus just described is not employed such as when the rear section Y is disconnected from the front section X as shown in Fig. 5, the traces connected to the double tree D are supported upon a hook E located adjacent the connection O but connected to the front section X.

The manner in which the apparatus operates will be readily understood by reference to Figs. 3 and 4. If I project the trace-line C, F, D, and produce the perpendicular B' B, we shall find that a pull through F C will have the same effect as having a rigid lever O B B' with the trace attached at B', except that the low extremity B' would be continually getting into trouble and consequently impracticable. Hence the trace-hook F, is fixed to the "perch" G, Fig. 1, which is just as effective, in securing the desired result as if it had been a rigid lever O B B' Fig. 4, where a man is shown pulling at B' which tends to turn the whole lever, clockwise, about B. A pull of 300 lbs. at B' will cause a lift at O equal to 120 lbs. If the resistance to forward motion were effected at O (the rear of the front vehicle) by removing the obstruction S', then there would not only be a lift at that point, but also a forward thrust equal to and in a line parallel with B' P. These two forces are the ones which produce the desired effect upon the horse at C. From this it will be seen that so long as the center of movements B, is located at the most suitable position it is a matter of no consequence as to how that center is carried. To raise that center will be to increase the mechanical leverage of B B', and the lift at O, or vice-versa. Whatever be the form of the rear vehicle it is essential that the lever O B B' should be free to respond to every variation of trace-pull. This lever may be made to any desirable shape to suit horse or mechanical tractors, without, in any way, departing from my claims.

Having so loaded the two portions of the wagon that each shall (preferably) do their respective share, whenever possible, in producing a necessary downward pressure of about 120 lbs. at O, (Fig. 3) in order to effect an upward lift of say 30 lbs. at the front end of the pole at point C, preferably, causing the rear lever F O B, to do the greater portion of this, the horses are thus required to exert a 30 lbs. downward force at C to balance the 120 lbs. at O. This vertically downward force would never tend to produce any forward motion to the wagon, nevertheless it is a force exerted by the horse and must be taken into consideration or you will never know what the horse is really doing. Inasmuch as this is one of the most essential (and absolutely indispensable) factors in raising the efficiency of the horse as a motor-machine it is impossible to attach too much importance to its right and proper use as a necessary component force coöperating with the pull in the trace in such a manner as that the resultant of their combined action will be conducive to the best interest of the draft animal or any other motor-machine, animate, or inanimate.

For instance, if a vehicle (loaded as above) were always running down hill on which gravitation alone would keep it running without any pull in the traces, then, the horse's legs and feet would be relieved of 30 lbs. of their normal pressure on the ground when standing; and, approximately, relieved of about 60 lbs. of impact at every stride (walking at 4-miles an hour.) It is when one comes to realize that it is this impact at their feet and knee-joints which is the direct cause of ruined legs and feet, that we begin to appreciate the value of any mechanical means of minimizing this ruinous element. The object of the new method of traction is two-fold. First—and not least—it is for the purpose of minimizing to the maximum extent, the above destructive element from the moment the horses are yoked to the moment they are unyoked. Secondly, it is, almost, an unerring mechanical means of automatically giving the horses an enormous advantage over their loads when climbing hills. This advantage is given to the draft-animals, by an automatic transference of weight from the wheels to their own bodily weight, thus—momentarily—making them equal to bigger and heavier horses; and, by this process the load to be hauled is actually reduced—thus a twofold mechanical advantage to any form of tractor, animate or inanimate.

By further reference to Fig. 3, aided by Fig. 4 we can plainly see how the virtual angles at which the horses are pulling, are continually varying to suit the varying tension in the traces. Let us see how these changes are brought about. It has been pointed out that when the horse is exerting no pull in the traces he is exerting T C (30 lbs.) downwardly at C to balance the load at O (120 lbs.) Now, suppose the vehicle to require a 50 lbs. pull through F C to keep it in motion on a given road—what is the horse doing? In what direction is he thrusting? Well, naturally, since he is exerting two shown forces 25 C (25 lbs.) and 50 C, (50 lbs.) then, surely the resultant of these is the diagonal 1 C, of the parallelogram 25 C 50 1 and 1 C is, therefore, the virtual angle of traction or thrust at that moment. Before proceeding further I ought to state that every 50 lbs. pull in the trace is effective in exerting an upward lift equal to 20 lbs. at O, therefore, immediately the pull in the traces reaches 50 lbs. the original lift of 30 at C will have been automatically reduced to 25 lbs., and, therefore, the parallelogram must be completed accordingly—and so on—as the magnitude of the trace-pull varies. Thus we get a continually varying resultant, or virtual, angle of pull. I have divided the extended trace-line C D, into 12 equal parts each representing 50 lbs. making a total of 600 lbs. When all the parallelograms are completed from each successive division you will find that the rear diagonal corner of every parallelogram will be in a straight line drawn from T to 12, and that the said straight line will intersect the trace-line at the 6th division which means that a 300 lbs. pull in the trace will effect a lift at O, equal to F Q (120), the diagonal of the parallelogram F P Q R in Fig. 3, or equal to W, in Fig. 4, which is effected by the lever O B B' as depicted in the two said Figs. 3 and 4. The latter of these two illustrations makes clear the functions of the rear lever, namely:—to press down, to lift-up and to press forward, at the rear of the front vehicle, just as and when required to suit the ever changing conditions of the roadway— except that in extreme cases when an intelligent driver can materially increase the advantages of the conversion, hence the importance of a theoretical and practical training. The new method opens up great possibilities in the hands of intelligent drivers who can get far more out of their horses with greater comfort to them than can other men. Reverting to the 300 lbs. pull: Since it is effective in reducing the original lift at C, to zero, the virtual angle of traction will now be F C, the line of the trace, whereas, with any less pull than 300 lbs., the virtual line of propulsion must be from a point above F; but if the pull is greater than 300 lbs., the virtual line of force exerted by the horse must be from a point below F. The virtual angle of thrust due to a 50 lbs. pull in the trace and a consequent 25 lbs. downward thrust at C, will be—as above stated—in the direction from E to C (through the diagonal I C, of the parallelogram 25 C 50 I); whereas, with 100 lbs. pull and a 20 downward thrust at C, the virtual angle of thrust by the horse will be in the direction from G to C (through the diagonal 2 C, of the parallelogram T C 100 2) and so on, regardless of the character of the rear vehicle so long as the lever O B B' or its equivalent F O B, is left unfettered and free to perform its function.

In the case of an inanimate motor it will, of course, be necessary to provide (preferably) a rigid arm to transmit the vertical forces to the tractor, and to allow a sliding movement of the rigid arm so that the hauling shall be done through the draw-bar and not through the said rigid arm. This feature is essential whatever be the tractor and must be provided for.

In the case of horse-traction care should be taken to allow the draw-bar D, sufficient sliding movement so as to cause all the pull to be effected at F, and also to avoid all cramping.

It is important to note that when weight is, automatically, transferred to the draft-animals, although the point at which the pole exerts its downward pressure is at C, or almost directly above his front feet, it is a fact that however hard the horse pulls, at this contrivance, he can never add a single ounce of weight to his front feet—the added, or transferred, weight goes direct to his hind feet giving him grip and a greater mechanical power. Many people—including great mathematicians—have sworn that the added weight comes on to the front feet. The contention is false. Let C J represent one arm of the lever constituted by the horse; and, J K, the other arm. Then, let W equal his forward weight which would fall to the ground unless supported by the horse's front legs, or by the pull in the trace.

The pull necessary to keep W in suspension will equal $W \times MJ \div JK$, therefore it is obvious that if W is automatically increased, and decreased, just as and when required, the horse must derive enormous advantage; for, as the resistance to traction increases, the increased pull in the trace tends to pull the horse over backward in a clockwise direction about his hind feet. The transferred weight from the vehicle to point C—simultaneously with the trace-pull is effective in yielding a virtual angle of the horse's pull, and thereby shortens the arm J K, thus enabling the animal to exert a bigger pull with his normal weight to say nothing of that transferred.

The new method of traction meets the requirements of every inch of road traversed from morn till night, and is applicable to any form of vehicle to which the above levers can be attached to a front and rear portion both of which are essential to procure the advantages claimed.

Having now particularly described and ascertained the nature of my said invention, and in what manner the same is to be performed, I declare that what I claim is:

1. An apparatus for hauling limbered vehicles, comprising a bar adapted to be slidably associated with the front section of the vehicle in advance of the axle, a member adapted to be fixed to the rear section of the vehicle so as to depend therefrom, and a flexible connection disposed in the same plane as said member and bar and connecting the same.

2. An apparatus for hauling limbered vehicles, comprising a member slidable on the front section of the vehicle in advance of the axle, a second member rigidly secured to and depending from the rear section of the vehicle, and means directly connecting said members to effect a forward and upward thrust of the front section when a tractive force is applied to the first member in a direction away from the second member.

3. In a limbered vehicle, a member movable on the front section of the vehicle in advance of the axle, a second member fixed to and depending from the rear section, and a third member directly connecting the two members, whereby as the draft is increased an upward thrust is exerted at the point of connection between the two sections of the vehicle.

In testimony whereof I affix my signature in presence of two witnesses.

THOMAS HARGREAVES BRIGG.

Witnesses:
 E. L. CREW,
 A. BROWNE.